(12) United States Patent
Sahu et al.

(10) Patent No.: US 12,540,758 B2
(45) Date of Patent: Feb. 3, 2026

(54) CONCENTRATED SOLAR THERMAL SYSTEM

(71) Applicant: Indian Oil Corporation Limited, Mumbai (IN)

(72) Inventors: Satyam Sahu, Faridabad (IN); Vinay Tiwari, Faridabad (IN); Umish Srivastva, Faridabad (IN); Deepak Saxena, Faridabad (IN); Sankara Sri Venkata Ramakumar, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 535 days.

(21) Appl. No.: 18/151,965

(22) Filed: Jan. 9, 2023

(65) Prior Publication Data
US 2023/0221042 A1 Jul. 13, 2023

(30) Foreign Application Priority Data
Jan. 11, 2022 (IN) .............................. 202221001568

(51) Int. Cl.
*F24S 23/79* (2018.01)
*F24S 10/25* (2018.01)
*F24S 23/72* (2018.01)

(52) U.S. Cl.
CPC ............... *F24S 23/79* (2018.05); *F24S 10/25* (2018.05); *F24S 23/72* (2018.05)

(58) Field of Classification Search
None
See application file for complete search history.

(56) References Cited

U.S. PATENT DOCUMENTS

| | | | | |
|---|---|---|---|---|
| 3,927,659 A | * | 12/1975 | Blake | F22B 1/00 |
| | | | | 126/684 |
| 10,876,521 B2 | * | 12/2020 | Anderson | F24S 10/70 |
| 2009/0277442 A1 | | 11/2009 | Jensen | |
| 2013/0008163 A1 | | 1/2013 | Godot | |

(Continued)

FOREIGN PATENT DOCUMENTS

| | | | | |
|---|---|---|---|---|
| CN | 102322694 A | | 1/2012 | |
| CN | 105841363 A | * | 8/2016 | F24S 80/00 |

(Continued)

OTHER PUBLICATIONS

Pagar et al., "Modified Solar Thermal Cavity Receivers for Parabolic Concentrating Collector: Review", International Journal of Advance Research and Development, 2017, vol. 2, Issue 6, pp. 97-107.

*Primary Examiner* — Jorge A Pereiro
(74) *Attorney, Agent, or Firm* — Workman Nydegger

(57) ABSTRACT

The present invention discloses a receiver for a concentrated thermal system. The thermal system includes a first heat exchange element helically coiled to receive a solar radiation from a first reflector and the second heat exchange element. Further, the first heat exchange element includes a first end and a second end to enable circulation of a heat exchange fluid in the first heat exchange element. The second heat exchange element being a helically coiled element is extending from and fluidically connected to the first end of the first heat exchange element. Further, the second heat exchange element is configured to receive absorb a part of solar radiation to preheat the heat exchange fluid flowing therein.

14 Claims, 4 Drawing Sheets

(56) References Cited

U.S. PATENT DOCUMENTS

2013/0306059 A1* 11/2013 Wang ...................... F24S 40/55
                                                    126/674
2017/0211848 A1* 7/2017 Ingram ................... H02S 40/44

FOREIGN PATENT DOCUMENTS

CN          110945089 A  *  3/2020   .............. F24S 70/30
WO         2020/252431 A1    12/2020

* cited by examiner

CONCENTRATED SOLAR THERMAL SYSTEM

TECHNICAL FIELD

The present invention relates to a concentrated solar thermal system, particularly to a cavity-shaped receiver for a concentrated solar thermal system having a parabolic dish reflector.

BACKGROUND

Nowadays, petroleum and coal reserves are continuously depleting and leading the world towards energy crisis. The present methods of producing and using the energy has led to the rise in the greenhouse gas emission. There is an essential need to rapidly reduce the consumption of conventional energy sources and thereby increasing the reliance on renewable energy sources for sustainable development. The solar energy harvesting is a great option to explore as most of the world is blessed with the abundant solar radiation. Over the years, solar PV systems have seen an exponential cost reduction and this has led to a high rate of commercialization. However, the efficiency of the solar PV systems is limited to 18-20%. Commonly, the solar radiation can be divided into two types-a direct normal radiation and a diffused solar radiation. Concentrated solar power systems came into existence as they can harvest the heat energy coming in form of Direct Normal Irradiation (DNI) and thus provide a higher efficiency. Further, the heat is captured by focusing the radiation collected by different type of collectors/reflectors on central receiver systems. The captured heat can directly be utilized for process heating purposes by employing a heat transfer fluid flow or else the captured heat can be converted into electricity by using Rankine/Brayton cycles. The integration of the thermal energy storage with the concentrated solar power systems has advantages in terms of power dispatchability.

Currently, the concentrated solar power systems have four types of thermal collectors such as parabolic trough-shaped collectors, heliostats-shaped collectors, linear Fresnel mirrors and parabolic dish concentrators. Among all collectors, the parabolic dish concentrator can provide the maximum concentration ratio up to 5000. Further, the parabolic dish concentrator may include a paraboloid shaped reflector with a receiver mounted on the focus. The receiver is a heat exchanger having a heat exchange fluid such as steam, molten salt etc. Here, the design of receiver is very crucial and it has significant implications on the thermal and optical efficiency of the parabolic dish systems. The thermal losses are combination of the conductive, convective and radiative losses while the optical losses mainly arise due to the imperfection of parabolic dish, spillage of converged radiation near focus and other reflectance losses. The optimization of design of the receiver is very important as it can lead to higher efficiency and lower manufacturing cost. The cavity shaped receivers have been the preferred in the concentrated solar power systems due to their low thermal losses and high efficiencies. However, there is still lot of scope for design thinking to minimize the energy losses and cost of receiver.

IN202041011252 discloses a flat plate receiver having two trumpet shaped secondary reflector situated at top and bottom of the flat plate receiver. The trumpet reflector at bottom side of the flat plate receiver is employed to reduce the losses due to fuzzy in parabolic dish. An additional trumped reflector on the top of the receiver is given to converge the radiation on the upper part of the flat plate and thus enhance the overall efficiency. The cooling water unit is provided in the art which circulates the water for extraction of heat from flat plate receiver. However, this system doesn't employ a cavity shaped receiver to optimize the thermal efficiency.

US2013/0008163A1 describes a design of a solar receiver comprising a plurality of tubular arrays mounted on a central longitudinal axis of a collector. The tubular arrays are arranged to form a cavity having a gaussian like curvature. The tubular array can have different diameters, material types and mass flow rate of the working fluid. The solar radiations are concentrated on the receiver through a sun-tracking concentrator. The tubular arrays communicate the thermal energy into the energy consumption systems such as a power generation system, a vapor generating systems, pasteurization systems, dryers, air conditioning and others. The output temperature of receiver may vary as per the requirement of communicating energy consumption system.

US2009/0277442 describes a detailing on design of solar receiver with a beam spreader for use in gas processing e.g., steam methane reforming. The receiver is a spirally wound tube in form of a conical cavity. The nickel superalloy is preferred as a tube material. The beam spreader situated on the vertex of the cone is coated with a material of high reflectance. The beam spreader reflects the radiation striking on it towards the conical receiver. The spreader is provided with the cooling mechanism. The interior of tube has been provided with an option of knurled or laterally corrugated insert for absorption of radiation and enhancing the convective heat transfer in the gases flowing through tube. The multilayer insulation envelope can be provided on the conical cavity to prevent heat losses.

Although the above-mentioned prior arts disclose concentrated solar power systems, however, the prior arts do not provide the end-to-end rectification of issues related to the thermal and optical efficiency.

Accordingly, there remains a need for a design of a receiver for a parabolic dish-based heating system. Further, there remains another need for a hemispherical cavity receiver provided with an additional reflector and a heat sink.

SUMMARY

This summary is provided to introduce a selection of concepts, in a simplified format, that are further described in the detailed description of the invention. This summary is neither intended to identify key or essential inventive concepts of the invention nor intended to determine the scope of the invention.

According to this embodiment, the present invention discloses a receiver for a concentrated thermal system. The thermal system includes a first heat exchange element helically coiled to receive a solar radiation from a first reflector and a second heat exchange element. Further, the first heat exchange element comprises a first end and a second end to enable circulation of a heat exchange fluid in the first heat exchange element. The second heat exchange element being a helically coiled element is extending from and fluidically connected to the first end of the first heat exchange element. Further, the second heat exchange element is configured to receive absorb a part of solar radiation to preheat the heat exchange fluid flowing therein.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF FIGURES

Figure 1:
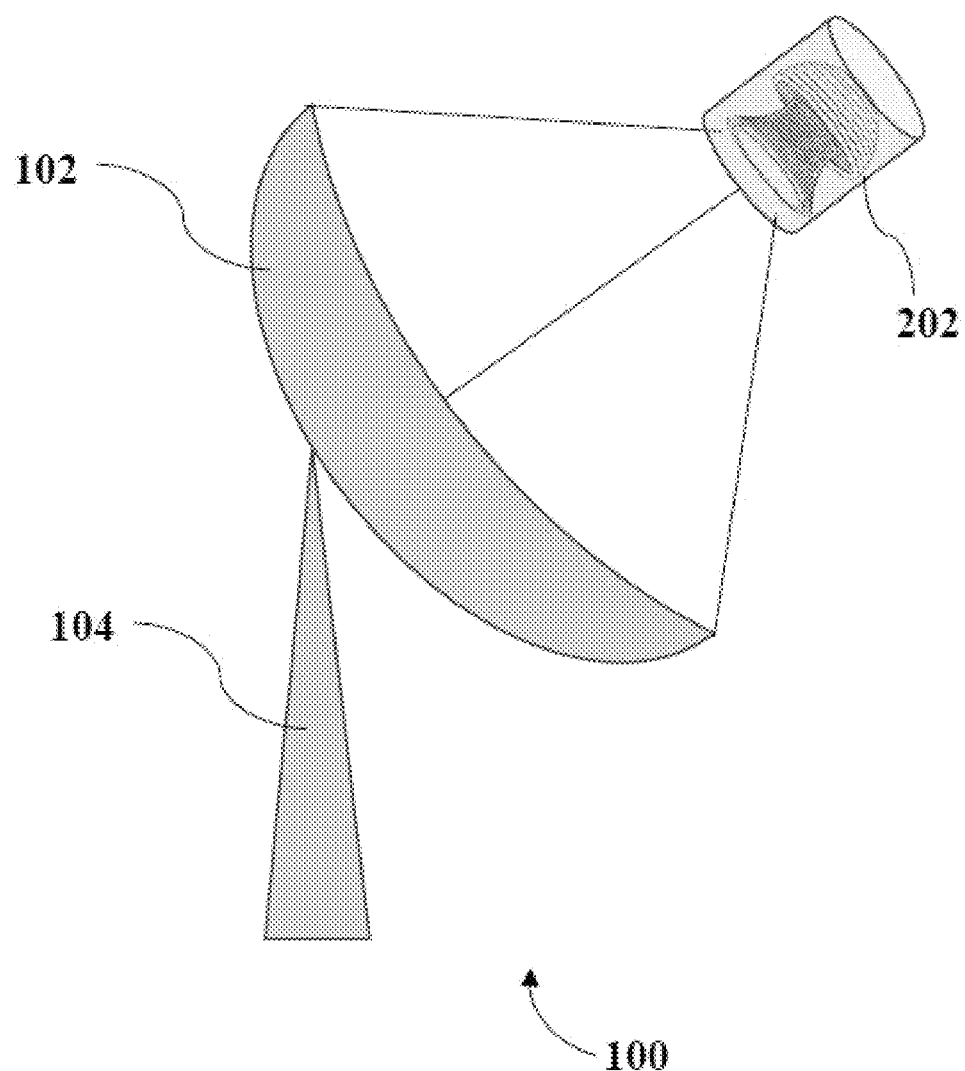
FIG. 1 illustrates a schematic view of a concentrated solar thermal system, in accordance with an embodiment of the present disclosure.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skill in the art to which this invention belongs. The system, methods, and examples provided herein are illustrative only and not intended to be limiting.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility, and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any feature and/or element described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Embodiments of the present invention will be described below in detail with reference to the accompanying drawings Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

The present disclosure provides an optimized design for a high efficiency cavity-shaped receiver for a parabolic dish-based heating system. Here, the present disclosure aims to minimize net effect of thermal and optical losses during the solar energy harvesting and identify a shape of a cavity forming a receiver for the parabolic dish-based heating system with minimal thermal losses.

FIG. 1 illustrates a schematic view of a concentrated solar thermal system 100, in accordance with an embodiment of the present disclosure. The concentrated solar thermal system 100, hereinafter referred to as thermal system, may include a first reflector 102 and a receiver 202 disposed at a distance from the first reflector 102. Here, the first reflector 102 is focused on the receiver 202. In other words, the receiver 202 is disposed in such a way that the receiver 202 can be focusing on the first reflector 102 to receive the solar radiation. Further, the first reflector 102 is installed on a stand 104. In this example, the first reflector 102 is of a shape carved out from a curvature of a paraboloid. In other words, the first reflector 102 is a parabolic shaped reflector. Here, the first reflector 102 may collect the solar radiation and redirect the collected solar radiation to the receiver 202.

In this example, the optical and thermal efficiency of the thermal system 100 may be optimized by a solar ray tracing and a numerical modelling. It may estimate the heat loss of the thermal system 100. Further, the thermal efficiency of the thermal system 100 is a ratio of a net energy flux available at outer surface of the first receiver 202 after deducting the heat losses to the direct normal irradiance incident on the aperture of the first reflector 102. On the other hand, the overall optical efficiency is defined as a ratio of an average energy flux reached on the surface area of the receiver 202 to a maximum possible energy captured by the first reflector 102 for a given time.

Further, the net direct solar radiation ($Q_{solar}$) captured by the first reflector 102 is determined by the Direct Normal Irradiance (DNI) and a projected area of the first reflector 102 ($A_{dish}$).

$$Q_{solar} = DNI * A_{dish}$$

The optical efficiency ($\eta_{optical}$) can be determined by the product of a reflectivity ($\rho$) and an intercept factor (which includes the effect of cosine and spillage losses), $$\eta_{optical} = \rho \cdot I_f$$

$$\eta_{optical} = Q_{incident} / Q_{solar}$$

Where,
$Q_{incident}$=Incident energy on receiver's internal surfaces
$Q_{solar}$=Incident solar energy on parabolic dish The net used energy can be calculated after deducting all thermal losses from the actual incident energy.

$$Q_{net} = Q_{incident} - Q_{cond} - Q_{rad} - Q_{conv}$$

Where,
$Q_{net}$=Net energy transferred to HTF
$Q_{cond}$=Conduction losses
$Q_{rad}$=Radiative losses
$Q_{conv}$=Convective losses Further, the thermal efficiency ($\eta_{thermal}$) of the receiver 202 can be calculated, $$\eta_{thermal} = Q_{net} / Q_{incident}$$

Therefore, the net efficiency of the receiver 202 is called by:

$$\eta_{receiver} = \eta_{thermal} \eta_{optical}$$

Where, $\eta_{receiver}$ is the net efficiency of the receiver
$\eta_{thermal}$ is the thermal efficiency of the receiver 202
$\eta_{optical}$ is optical efficiency of receiver Here, four key losses are to be considered while designing the receiver 202 and such losses are the convective loss, the emissive loss, the reflectance loss and the spillage loss. Further, the spillage losses can be decreased by increasing an aperture radius on the first reflector 102. On other hand, the reflective and emissive losses can be decreased with a smaller radius and a larger height of the first reflector 102.

Figure 2A:
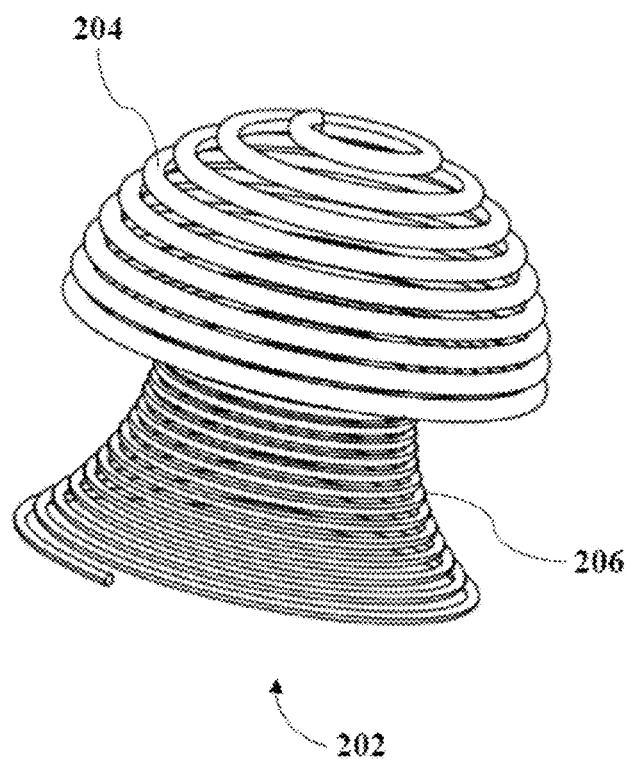
FIG. 2A illustrates a perspective view of the receiver of the FIG. 1, in accordance with an embodiment of the present disclosure.
Figure 2B:
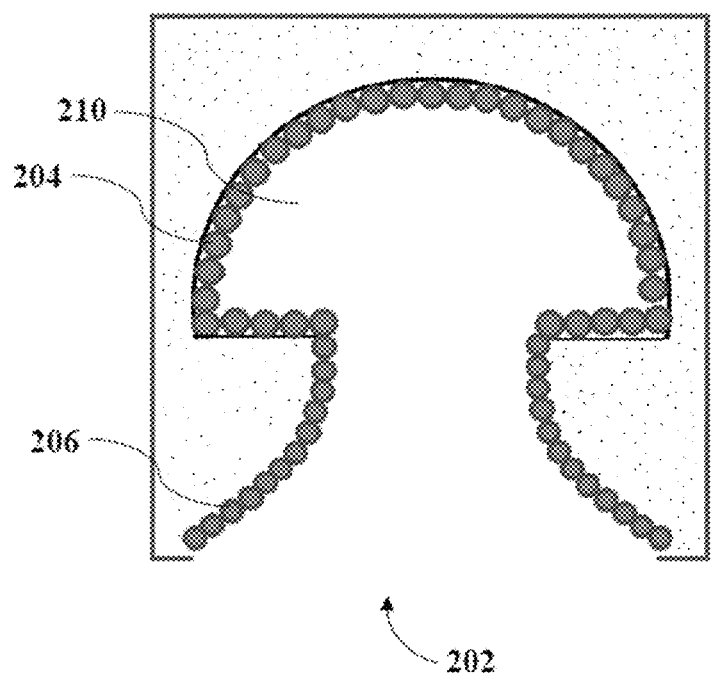
FIG. 2B illustrates a cross-sectional view of the receiver of FIG. 2A along a vertical axis of the receiver.

FIGS. 2A and 2B illustrate schematic views of the receiver 202 of the FIG. 1, in accordance with an embodiment of the present disclosure. In this example, FIG. 2A is a perspective view of the receiver 202 of the FIG. 1 and FIG. 2B is a cross-sectional view of the receiver 202 of FIG. 1 along a vertical axis of the receiver 202. According to the present embodiment, the receiver 100 includes a first heat exchange element 204 and a second heat exchange element 206. In one example, the first heat exchange element 204 and the second heat exchange element 206 are the heat exchange tubes configured to enable heat exchange between a heat exchange fluid flowing therein and the solar radiation received from the first reflector 102. The heat exchange fluid can be any one of the synthetic heat transfer liquid/ionic liquids with additive, phase change materials and any gaseous heat transfer fluid.

Further, the first heat exchange element 204 and the second heat exchange element 206 are helically coiled elements and fluidically connected with each other. In other words, one end of the second heat exchange element 206 is connected to one end of the first heat exchange element 204, so that the heat exchange fluid may circulate between both the first and second heat exchange elements 204, 206. Particularly, the first heat exchange element 204 may include a first end and a second end to enable circulation of the heat exchange fluid in the first heat exchange element 204. Similarly, the second heat exchange element 206 may include a first end and a second end to enable circulation of the heat exchange fluid in the second heat exchange element 206.

The second heat exchange element 206 is a helically coiled element extending from the first end of the first heat exchange element 204. Further, the first heat exchange element 204 may receive/absorb the solar radiation and the second heat exchange element 206 may absorb a part of the solar radiation to preheat the heat exchange fluid flowing therein. In this example, the second heat exchange element 206 is an extended part extending from the first heat exchange element 204. Here, the heat exchange fluid may enter the receiver 202 from the second heat exchange element 206 and egress the receiver 202 from the first heat exchange element 204. Particularly, the first end of the second heat exchange element 206 is connected to the first end of the first heat exchange element 204 and the second end of the second heat exchange element 206 is connected to a fluid inlet of the thermal system 100 to introduce the heat exchange fluid into the first and second heat exchange elements 204, 206. Similarly, the second end of the first heat exchange element 204 is connected to a fluid outlet of the thermal system 100 to receive the heat exchange fluid from the first and second heat exchange elements 204, 206.

In this example, the first heat exchange element 204 may be helically coiled to a hemispherical shape forming a cavity 210 therein as shown in FIG. 2A. Further, the second heat exchange element 206 may be helically coiled to define a hyperboloid shape and extending from the first heat exchange element 204. Further, the first heat exchange element 204 and the second heat exchange element 206 are tubes formed of any one of stainless steel, Copper, Hastelloy and metal-alloys. As shown in FIG. 2A, the first heat exchange element 204 is helically coiled from an aperture till the second heat exchange element 206 so that the cavity 210 is formed therein. The second heat exchange element 206 may help in reducing the spillage losses and may be used as a preheater to preheat the heat exchange fluid.

Figure 3A:
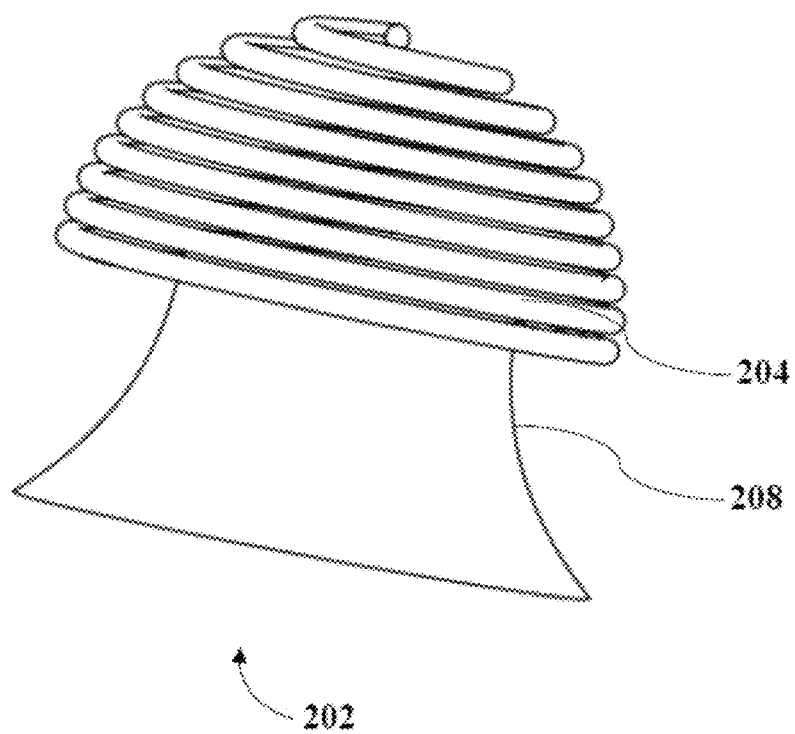
FIG. 3A illustrates a perspective view of the receiver of the FIG. 1 with an additional reflector, in accordance with another embodiment of the present disclosure.
Figure 3B:
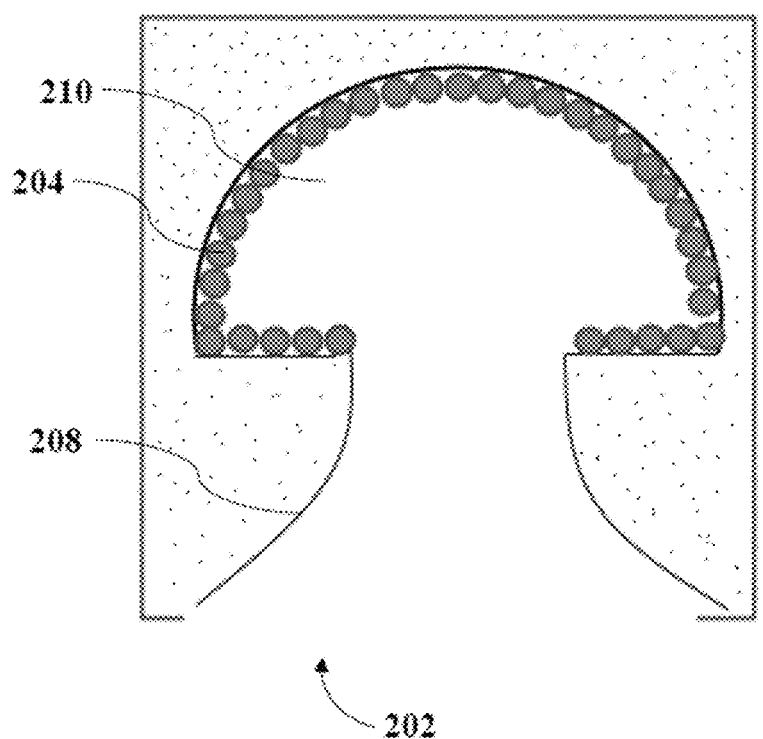
FIG. 3B illustrates a cross-sectional view of the receiver of FIG. 3A along a vertical axis of the receiver.

FIGS. 3A and 3B illustrate schematic views of the receiver 202 of the FIG. 1, in accordance with another embodiment of the present disclosure. In this example, FIG. 3A is a perspective view of the receiver 202 of the FIG. 1 with another reflector 208 and FIG. 3B is a cross-sectional view of the receiver 202 of FIG. 3A along a vertical axis of the receiver 202. For the sake of brevity, features of the present disclosure that are already described in detail in the description of FIGS. 2A-B are not described in detail in the description of FIGS. 3A-B. According to his embodiment, the receiver 202 may be provided with a secondary reflector 208 extended from the first heat exchange element 204. Here, the secondary reflector 208 is a hyperboloid reflector adapted to receive a part of solar radiation and redirect the solar radiation to the first heat exchange element 204.

Here, the secondary reflector 208 is having the reflectivity more than 90% and re-focus the escaping solar radiation towards the first heat exchange element 204, thereby preventing the radiative losses. Also, the secondary reflector 208 increases overall optical efficiency of the receiver 202 by 1.24 times of the efficiency of the receiver 202 without the secondary reflector 208. In this embodiment, the receiver 202 is provided with the first heat exchange element 204 and the secondary reflector 208. According to this embodiment, the heat exchange fluid may enter and leave the receiver 202 through the first heat exchange element 204. As the first reflector 102 directs the solar radiation to the first heat exchange element 204, so that the first heat exchange element 204 may enable heat exchange between the solar radiation and the heat exchange fluid. Thereafter, the heat exchange fluid having higher temperature/heat can be utilized for various functions. Although the first reflector 102 directs the solar radiation to the first heat exchange element 204, a part of the solar radiation may be spilled or escaped from the receiver 202. To avoid such things, the secondary reflector 208 is provided in the receiver 202 and the secondary reflector 208 may redirect the spilled radiation back to the first heat exchange element 204, thereby increasing overall optical efficiency of the thermal system 100.

Figure 4A:
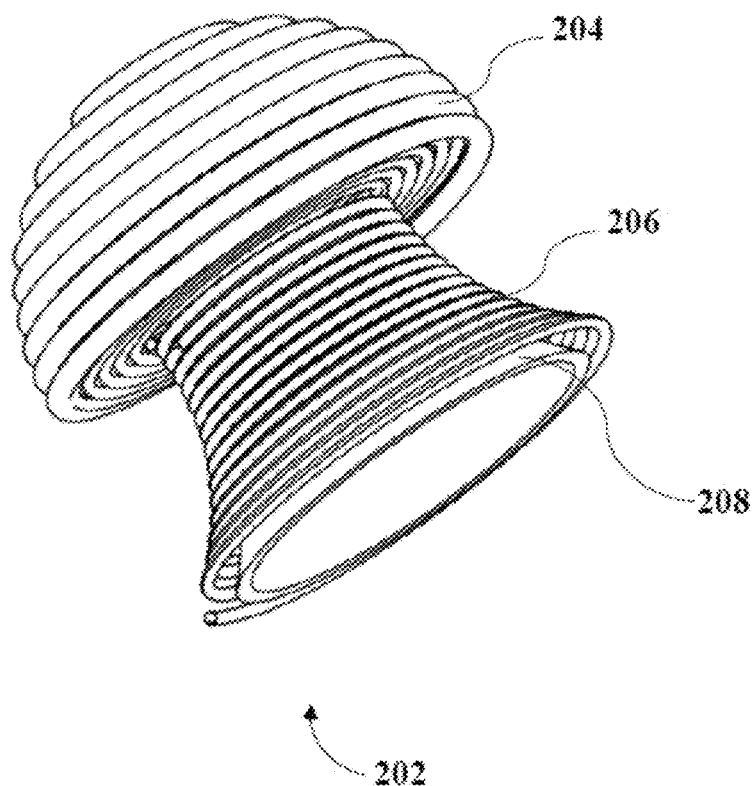
FIG. 4A illustrates a perspective view of the receiver of FIG. 1 with a second heat exchange element and a secondary reflector, in accordance with another embodiment of the present disclosure.
Figure 4B:
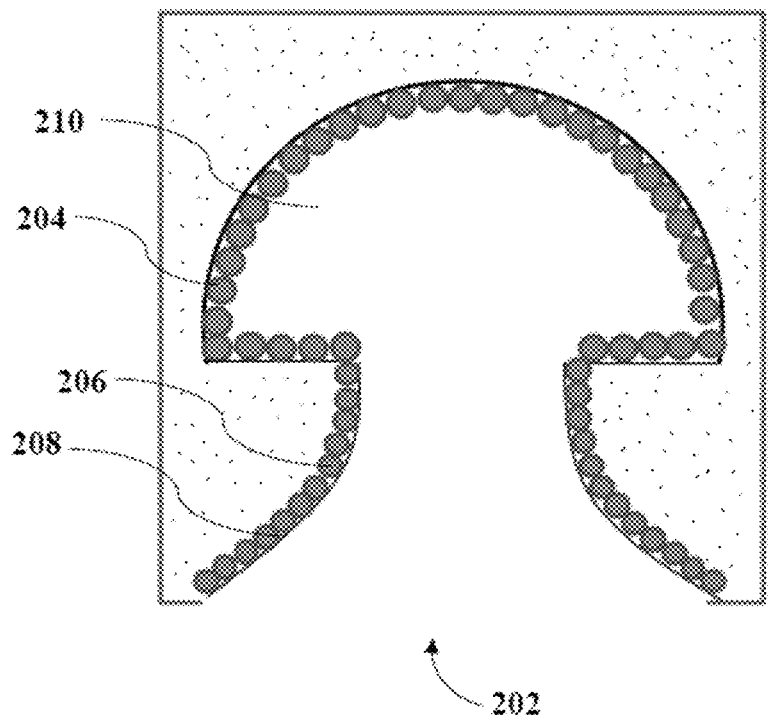
FIG. 4B illustrates a cross-sectional view of the receiver of FIG. 4A along a vertical axis of the receiver.

FIG. 4A-B illustrate schematic views of the receiver 202 of FIG. 1, in accordance with another embodiment of the present disclosure. In this example, FIG. 4A is a perspective view of the receiver 202 of FIG. 1 with the second heat exchange element 206 and the secondary reflector 208 and FIG. 4B is a cross-sectional view of the receiver 202 of FIG. 4A along a vertical axis of the receiver 202. For the sake of brevity, features of the present disclosure that are already described in detail in the description of FIGS. 2A-B and 3A-B are not described in detail in the description of FIGS. 4A-B. As disclosed, the first heat exchange element 204 and the second heat exchange element 206 are helically coiled to form the cavity 210. According to this embodiment, the secondary reflector 208 is a hyperboloid shaped reflector formed in proximity to the second heat exchange element 206 to receive a part of solar radiation and direct the solar radiation to the first heat exchange element 204.

According to the present embodiment, the second heat exchange element 206 is helically coiled on the secondary reflector 208. As the secondary reflector 208 is shaped to a hyperboloid shape, the second heat exchange element 206 is also helically coiled to define the hyperboloid shape. In other words, the shape of the second heat exchange element 206 is complementary to the shape of the secondary reflector 208. Further, the receiver 202 may include a heat absorbing coating applied on a surface of the first heat exchange element 204 facing the cavity 210. The heat absorbing coating can be commercially available solar selective absorbers such as spinel oxides, perovskites, metal-dielectric tandems, WAl, AlN etc. The receiver 202 is provided with the proper insulation cover with the thermal conductivity less than 0.05. Here, the insulation cover can be commercially available materials such as glasswool, rockwool, Aerogel, Microtherm etc. Further, the second heat exchange element 206 can be referred to as a heat sink configured to preheat the heat exchange fluid flowing therein. Due to higher concentration ratio (>1000) of the thermal system 100, some of the heat/solar radiation may be dissipated on the secondary reflector 208. Such heat can be used to preheat the heat exchange fluid by the second heat exchange element 206 coiled around the secondary reflector 208 completely or partially. As a result, thermal and optical efficiency of the thermal system

We claim:

1. A receiver for a concentrated thermal system, the receiver comprising:
    a first heat exchange element helically coiled to receive solar radiation from a first reflector, wherein the first heat exchange element comprises a first end and a second end to enable circulation of a heat exchange fluid in the first heat exchange element and wherein first heat exchange element is coiled to define a hemispherical shape having a cavity therein;
    a second heat exchange element helically coiled and extend from and fluidically connected to the first end of the first heat exchange element, wherein the second heat exchange element is configured to absorb a part of the solar radiation to preheat the heat exchange fluid circulating therein; and
    a hyperboloid reflector to receive a part of the solar radiation and redirect the part of the solar radiation to the first heat exchange element, wherein the second heat exchange element is helically coiled on the hyperboloid reflector wherein the hyperboloid reflector is configured to increase optical efficiency of the receiver by 1.24 times than a receiver without a hyperboloid reflector.

2. The receiver as claimed in claim 1, wherein a first end of the second heat exchange element is connected to the first end of the first heat exchange element and a second end of the second heat exchange element is connected to a fluid inlet to introduce the heat exchange fluid into the first heat exchange element and the second heat exchange element.

3. The receiver as claimed in claim 2, wherein the second end of the first heat exchange element is connected to a fluid outlet to receive the heat exchange fluid from the first heat exchange element and second heat exchange element.

4. The receiver as claimed in claim 1, further comprising a heat absorbing coating applied on a surface of the first heat exchange element facing the cavity.

5. The receiver as claimed in claim 4, wherein the heat absorbing coating is a spinel oxide, perovskite, metal-dielectric tandems, or ceramic-metal composites.

6. The receiver as claimed in claim 1, wherein the first heat exchange element and the second heat exchange element are heat exchange tubes formed of stainless steel, Copper, Hastelloy or metal-alloys.

7. The receiver as claimed in claim 1, wherein the heat exchange fluid is a synthetic heat transfer liquid/ionic liquid with additives, a phase change material, or a gaseous heat transfer fluid.

8. The receiver as claimed in claim 1, wherein the first heat exchange element and the second heat exchange element are heat exchange tubes configured to enable exchange of heat between the heat exchange fluid flowing therein and the solar radiation received from the first reflector.

9. The receiver as claimed in claim 1, wherein the hyperboloid reflector has 90% reflectivity and is configured to re-focus escaping solar radiation towards the first heat exchange element, thereby preventing the radiative losses.

10. The receiver as claimed in claim 1, wherein the receiver is provided with an insulation cover having a thermal conductivity less than 0.05.

11. The receiver as claimed in claim 10, wherein the insulation cover is made of glass wool, rockwool, or Aerogel.

12. A concentrated solar thermal system comprising:
a first reflector configured to collect solar radiation; and
a receiver placed at a distance from the first reflector, wherein the first reflector is configured to redirect the collected solar radiation to the receiver wherein the receiver comprises of a first heat exchange element helically coiled to receive solar radiation from a first reflector, wherein the first heat exchange element comprises a first end and a second end to enable circulation of a heat exchange fluid in the first heat exchange element and wherein first heat exchange element helically coiled is configured to define a substantially hemispherical shape forming a cavity; and
a second heat exchange element helically coiled and extend from and fluidically connected to the first end of the first heat exchange element, wherein the second heat exchange element is configured to absorb a part of the solar radiation to preheat the heat exchange fluid circulating therein; and
a hyperboloid reflector to receive a part of the solar radiation and redirect the part of the solar radiation to the first heat exchange element, wherein the second heat exchange element is helically coiled on the hyperboloid reflector wherein the hyperboloid reflector is configured to increase optical efficiency of the receiver by 1.24 times than a receiver without a hyperboloid reflector.

13. The concentrated solar thermal system as claimed in claim 12, wherein the first reflector is of a shape carved out from a curvature of a paraboloid.

14. The concentrated solar thermal system as claimed in claim 12, wherein a first end of the second heat exchange element is connected to the first end of the first heat exchange element and a second end of the second heat exchange element is connected to a fluid inlet to introduce the heat exchange fluid into the first heat exchange element and the second heat exchange elements.

* * * * *